United States Patent Office 3,043,876
Patented July 10, 1962

3,043,876
4a,12a-ANHYDRO-4-DESDIMETHYLAMINOTETRA-CYCLINE AND ANALOGS THEREOF
Hans H. Rennhard, Lyme, Lloyd H. Conover, Quaker Hill, Philip N. Gordon, Old Lyme, and Charles R. Stephens, Jr., Niantic, Conn., assignors to Chas. Pfizer & Co., Inc., New York, N.Y., a corporation of Delaware
No Drawing. Filed Jan. 29, 1960, Ser. No. 5,336
8 Claims. (Cl. 260—559)

This invention is concerned with a process for the preparation of certain novel organic compounds and with the new compounds thus prepared. In particular, it is concerned with the preparation of certain derivatives of tetracyclinetype antibiotics and the acid addition salts thereof.

The term "tetracycline-type antibiotics" is taken to include tetracycline, 5-hydroxytetracycline, 7-chlortetracycline, 7-bromotetracycline, all of which possess a highly substituted hydronaphthacene ring system, and certain derivatives of these compounds, such as, 6-demethyltetracycline, 6-deoxytetracycline, 4-epi-tetracycline, 6-deoxy-6 - dimethyltetracycline, 6-demethyl-7-chlortetracycline, and 5-hydroxy-6-deoxytetracycline. Also included are the acid addition salts thereof with mineral acids, such as, hydrochloric, sulfuric and phosphoric acids, and with strong organic acids, such as, paratoluene sulfonic acid.

In the literature certain 4-desdimethylaminotetracyclines have been described being prepared by the reaction of a tetracycline with zinc and acetic acid. Exemplary of these compounds is 4-desdimethylamino-12α-deoxy-7-chlortetracycline prepared from chlortetracyline.

The new compounds of the present invention are 12α-deoxytetracyclines which may be represented by the following formula although other enolic tautomers are possible:

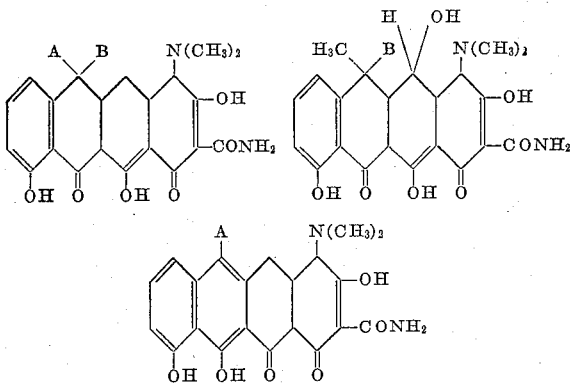

and the pharmaceutically acceptable acid addition salts and metal chelates salts thereof wherein: A is selected from the group consisting of hydrogen and methyl; and B is selected from the group consisting of hydrogen and hydroxyl.

These novel substances have molecular formulas which differ from those of the parent tetracycline-type antibiotics from which they are derived by an oxygen atom; said oxygen atom being removed from the 12a-position to give 12a-deoxy tetracycline-type antibiotics. From a structural standpoint, replacement of the 12a-hydroxyl group by hydrogen is accompanied by a change in the direction of enolization in the B ring of the tetracycline-type antibiotices.

The compounds of this invention have unique pharmaceutical and physiological properties which distinguish them from the parent antibiotics and related derivatives thereof. Their antibiotic spectra differ from those of the parent compounds.

The pure 12a-deoxy compounds possess activity against a variety of gram-positive and gram-negative microorganisms and, in addition, are effective against tetracycline-resistant strains of bacteria. By virtue of this lack of cross-resistance they represent a significant contribution to the pharmaceutical industry and the public welfare. They appear to be rapidly and completely absorbed from the gastrointestinal tract. The present substances in the pure free base form are very insoluble in water and in most of the common organic solvents which particularly adapts them for use in the preparation of pharmaceutical suspensions, topical preparations, such as dusting powders and ointments, and for repository parenteral forms for intramuscular use. They provide aqueous suspensions which have improved stability and a bland taste, and, since they possess activity similar to the parent tetracycline compounds, are used in dosage forms and compositions of similar concentration. They appear to be far more resistant to epimerization than are the parent antibiotics from which they are derived, and those containing a 6-hydroxyl group are particularly susceptible to dehydration at the 5a,6-positions on treatment with a strong acid.

The process of the present invention may be carried out in general by catalytic hydrogenation, in a substantially anhydrous reaction-inert solvent, of a 12a-(O-acyl) derivative of the desired tetracycline-type antibiotic wherein the acyl radical is that of a hydrocarbon carboxylic acid containing from one to six carbon atoms, inclusive or of the 12a-(O-arylcarbamyl) derivative of the appropriate tetracycline-type antibiotic wherein the arylcarbamyl radical is selected from the group consisting of

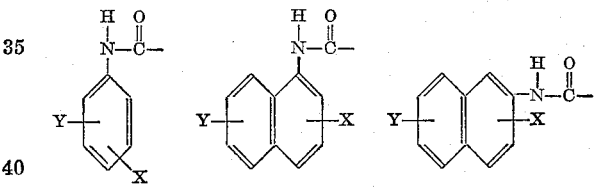

wherein X and Y are selected from the group consisting of hydrogen, halogen, nitro, amino, lower alkyl and lower alkoxy. Suitable 12a-(O-acylated)-tetracycline-type antibiotics which may serve as starting materials for the process of this invention to produce the novel 12a-deoxy compounds within the purview of this invention are listed below:

12a-(O-monoformyl)tetracycline
12a-(O-monoformyl)-6-demethyltetracycline
12a-(O-monoformyl)-6-deoxytetracycline
12a-(O-monoformyl)-6-deoxy-6-demethyltetracycline
12a-(O-monoformyl)-6-demethyl-7-chlortetracycline
12a-(O-monoformyl)-7-bromotetracycline
12a-(O-monoformyl)-7-chlorotetracycline
12a-(O-monoacetyl)-5-hydroxytetracycline
12a-(O-monopropionyl)-5-hydroxytetracycline
12a-(O-monoacetyl)-7-chlortetracycline
12a-(O-monoacetyl)tetracycline
12a-(O-monobutyryl)-7-chlortetracycline
12a-(O-monobutyryl)tetracycline
12a-(O-mono-n-caproyl)tetracycline
12a-(O-monobutyryl)-5-hydroxytetracycline
12a-(O-monovaleryl)tetracycline 12a-(O-arylcarbamyl) derivatives suitable as reactants in the process of this invention are:

12a-(O-phenylcarbamyl)tetracycline
12a-(O-phenylcarbamyl)-6-demethyltetracycline
12a-(O-phenylcarbamyl)-6-deoxytetracycline
12a-(O-phneylcarbamyl)-7-chlorotetracycline 12a-(O-phenylcarbamyl)-4-desdimethylaminotetracycline
12a-(O-phenylcarbamyl)-5-hydroxytetracycline
12a-(O-2,5-dichlorophenylcarbamyl)tetracycline
12a-(O-p-methoxyphenylcarbamyl)-5-hydroxytetracycline
12a-(O-p-iodophenylcarbamyl)-6-deoxy-5-hydroxytetracycline
12a-(O-p-methoxyphenylcarbamyl)tetracycline
12a-(O-o-xylylcarbamyl)-6-demethyl-7-chlortetracycline
12a-(O-p-butylphenylcarbamyl)-6-deoxytetracyline
12a-(O-2,4-dichlorophenylcarbamyl)tetracycline
12a-(O-2-nitro-4-tolylcarbamyl)tetracycline
12a-(O-o-chlorophenylcarbamyl)tetracycline
12a-(O-o-methoxyphenylcarbamyl)tetracycline
12a-(O-p-bromophenylcarbamyl)tetracycline
12a-(O-p-ethoxyphenylcarbamyl)tetracycline
12a-(O-p-nitrophenylcarbamyl)tetracycline
12a-(O-naphthylcarbamyl)tetracycline
12a-(O-2-naphthylcarbamyl)-5-hydroxytetracycline
12a-(O-2-methyl-1-naphthylcarbamyl)-5-hydroxytetracycline
12a-(O-1-naphthylcarbamyl)-7-chlortetracycline
12a-(O-2,5-dichloro-1-naphthylcarbamyl)tetracycline
12a-(O-3,4-dimethyl-1-naphthylcarbamyl)-6-demethyltetracycline
12a-(O-p-nitrophenylcarbamyl)desdimethylaminotetracycline
12a-(O-p-nitrophenylcarbamyl)-4-desdimethylamino-5-hydroxytetracycline
12a-(O-phenylcarbamyl)-4-desdimethylamino-6-deoxy-6-demethyltetracycline
12a-(O-p-fluorophenylcarbamyl)-6-deoxytetracycline
12a-(O-p-aminophenylcarbamyl)-5-hydroxytetracycline
12a-(O-p-aminophenylcarbamyl)-4-desdimethylamino-5-hydroxytetracycline The 12a-(O-monoformyl) derivatives utilized as reactants in the present process are prepared from the tetracycline-type antibiotics by treatment with from 1 to 25 molecular proportions of acetoformic acid at a temperature of from −30° C. to +50° C. as described in the copending patent application filed on December 23, 1958, by Stephens and Blackwood, Serial No. 782,407, now abandoned. The phenylcarbamyl derivatives utilized as reactants are prepared from the tetracycline-type antibiotics by reaction with the appropriate aryl isocyanate under anhydrous conditions in an inert solvent as described in the copending patent application of Blackwood, Serial No. 813,653 filed May 18, 1959, now Patent Number 2,976,318. The 12a-(O-monoesters) other than the 12a-(O-monoformyl) derivatives are prepared as described by Gordon, U.S. 2,812,349, November 5, 1957.

Suitably a tetracycline-type antibiotic having acyl groups in other positions of the molecule in addition to the 12a-position can also be used in the process of this invention. Thus, 10,12a - (O - diacyl)-5-hydroxytetracycline, 5,12a - (O - diacyl) - 5 - hydroxytetracycline, 12,12a - (O - diacyl) - 4 - epi - tetracycline, 12,12a - (O-diacyl)-tetracycline, and diformyl - 5 - hydroxytetracycline undergo hydrogenolysis with removal of the 12a-acyloxy group to produce the corresponding 12a-deoxy derivative of the acylated tetracycline type antibiotic. Hydrogenolysis of a polyacylate derivative, wherein for example, the 6 and 12a-hydroxy groups are acylated, by the process of this invention results in simultaneous replacement of both ester groups by hydrogen with formation of a dideoxy derivative. The remaining acyl groups can be removed by hydrolysis with, for example, an alkaline reacting material such as, ammonium hydroxide, sodium carbonate, sodium hydroxide or the corresponding potassium salts. Acid hydrolyzing agents are operative in certain cases. They are recommended only with 6-deoxy compounds in view of undesirable side reactions, such as, dehydration, which may occur when a hydroxyl group is present at the 6-position. Of the many hydrolyzing agents available, ammonium hydroxide is preferred since it permits the use of mild reaction conditions and avoids side reactions.

The 10,12a-(O-diacyl) derivatives are obtained as described in the copending patent application Serial No. 813,652, filed May 18, 1959. The 12,12a-(O-diacyl), the 5,12a-(O-diacyl) derivatives utilized as starting materials are prepared according to the procedure of Gordon described in the copending application filed on July 2, 1957, Serial Number 669,442, and now abandoned.

The 12a-(O-monoformyl) and 12a-(O-arylcarbamyl) derivatives undergo hydrogenolysis under mild conditions of temperature and pressure; that is, at temperatures from about 45° C. to 100° C. and pressures from about atmospheric to about 150 p.s.i. The remaining 12a-(O-acyl) derivatives require conditions of higher pressures to effect reduction.

The presence of an acyl group at the C–10 hydroxy group, in addition to the C-12a-hydroxy group, appears to activate hydrogenolysis to the 12a-deoxy compound whereas an acyl group in certain other positions appears to retard reaction. Thus, the 10,12a-(O-diacetyl) derivative of 5-hydroxytetracycline undergoes hydrogenolysis with conversion of the 12a-deoxy derivative of 10-(O-monoacetyl)-5-hydroxytetracycline under mild conditions of temperature and pressure. The 5,12a-(O-diacetyl) derivative of 5-hydroxytetracycline, on the other hand, requires relatively high pressures and elevated temperatures in order to effect removal of the 12a-acyloxy group.

12a-(O-acyl) and arylcarbamyl derivatives of 7-bromotetracyclines and 7-chlortetracyclines, when subjected to the process of the present invention, undergo a two step hydrogenolysis to produce 12a-deoxytetracyclines.

In carrying out the process of the present invention, the 12a-(O-monoformyl) or 12a-(O-arylcarbamyl) derivative of a tetracycline-type antibiotic, is dissolved in a suitable substantially anhydrous reaction-inert solvent and hydrogenated in the presence of a suitable hydrogenation catalyst. As suitable solvents there may be mentioned dioxane, tetrahydrofuran, ethyl acetate, dimethylformamide, pyridine, phenetole, dialkyl ethers, cellosolve acetate, and other aprotic solvents. Tetrahydrofuran, ether and dioxane represent preferred solvent systems. Solvents which contain hydroxyl groups, such as alcohols, are detrimental to the process of this invention since they may cause hydrolysis of the 12a-formyl group. However, with other 12a-acyl or arylcarbamyl derivatives, alcohols are operative as solvents. Solvents such as aldehydes and ketones, which are unstable to hydrogenation are to be avoided. The solvent used need not be completely anhydrous. Traces of water, such as are found in the commercially available grades of solvents suitable for the process do not interfere with the reaction.

The choice of hydrogenation catalyst is not critical. The noble-metal hydrogenation catalysts, such as, palladinized-charcoal, platinum black, and platinum oxide can be used. Palladinized charcoal is the preferred catalyst in view of its availability, the relatively mild reaction conditions which it requires, and the overall yields realized. In general, from about 1% to about 10% of palladium, based upon the weight of tetracycline-type antibiotic present, is used in the form of palladinized charcoal (5%). Smaller or larger quantities of catalyst can be employed; however, the range cited above is satisfactory from the standpoint of yields and economics.

The temperature, pressure and time of the reaction are inter-related to the extent that a high temperature permits utilization of a relatively low pressure and relatively short reaction times; whereas a low temperature requires a relatively high pressure and generally relatively longer reaction periods.

In general, a temperature of from about 45° C. to about 100° C. can be used. Lower and higher temperatures are operable but not desirable because of poor yields resulting from insufficient reaction or decomposition.

A pressure of from about atmospheric to about 2000 p.s.i. can be used over the temperature range given above. Lower and higher pressures are operable but, because of low yields of desired products, or the need for specialized apparatus, are not desirable.

A reaction period of from about ¼ hour to about 25 hours, depending upon the temperature and pressure chosen, is generally adequate to produce maximum yields.

In general, it is preferred to use the 12a-(O-monoformyl)-, 12a-(O-arylcarbamyl)- and 10,12a-(O-diacyl) derivatives of the tetracycline-type antibiotics as reactants for preparing the 12a-deoxy compounds of this invention because of the relatively mild reduction conditions required. The reaction is advantageously conducted in tetrahydrofuran using from about 1% to 5% palladium on charcoal (5%) by weight of tetracycline-type antibiotic as hydrogenation catalyst at a temperature of from about 45° C. to 85° C. and a hydrogen pressure of from about 40 p.s.i. to 100 p.s.i. for a period of about 8 hours to 20 hours. At the end of the reaction period, the hydrogen pressure is released, the vessel flushed with nitrogen and the contents removed. The catalyst is removed by filtration and washed with solvent. An equal volume of methanol is added to the combined filtrate and washings and the mixture concentrated under reduced pressure. The product is removed by filtration, washed with methanol and dried in vacuo at about 75° C.

When using the 5,12a-(O-diacetyl)-, the 12a-(O-monoacetyl) and the diformyl derivatives of 5-hydroxytetracycline as starting materials, pressures up to 2000 p.s.i. and temperatures up to 100° C. may be required to bring about hydrogenolysis. Side reactions may occur in some cases. The products thus obtained which still contain an acyl group can be hydrolyzed directly to the 12a-deoxy-non-acylated derivatives and then isolated in the manner described. Alternatively, the 12a-deoxy-acyl derivative can be separated as such by evaporation of the solvent or by precipitation with, for example, a non-solvent, such as, hexane, and then subjected to hydrolysis whereby the remaining acyl group is removed.

The present processes are also suitable for the preparation of the aforementioned prior art 12a-deoxy-4-desdimethylaminotetracyclines and, additionally, new 12a-deoxy-4-desdimethylaminotetracyclines, e.g. the corresponding 6-deoxy, 6-demethyl and 6-deoxy-6-demethyl compounds. These new 12a-deoxy-4-desdimethylaminotetracyclines containing at least one hydrogen in the 6-position are particularly valuable because of their improved acid stability over the corresponding prior art compounds. This improved acid stability makes them more suitable for use as intermediates in the synthesis of tetracyclines, particularly in reactions where acids are employed, such as halogenation in strongly acid medium e.g. bromination in sulfuric, hydrobromic or trifluoracetic acid. Of particular value is 4-desdimethylamino-6,12a-dideoxy-6-demethyltetracycline which may be synthesized from simple organic compounds or prepared according to the present procedure.

The 12a-deoxy tetracycline-type antibiotics of this invention are often yellow to orange-red in color and are often difficultly soluble in methanol, ethanol, water, slightly soluble in tetrahydrofuran and soluble in pyridine and dimethylformamide. In the case of 12a-deoxytetracycline, the product is obtained from methanol as orange-red crystals containing one mole of solvated methanol which is not removed on heating up to 65° C. and at pressures as low as 0.1 mm. It appears to exist in two tautomeric forms; one stable and one unstable, which are not separable by ordinary methods. The presence of an unstable form is suggested by the relatively rapid change in the ultraviolet spectrum of a freshly prepared solution on standing. After about 10 to 20 minutes, the ultraviolet spectrum exhibits no further change apparently due to complete conversion to the more stable of the two tautomers. A freshly prepared solution exhibits maxima in the ultraviolet region at 264 m$\mu$, 325 m$\mu$, 430 m$\mu$, and 450 m$\mu$, with log E values of 4.64, 4.51, 4.43, and 4.37 respectively. Within approximately 20 minutes a constant ultraviolet spectrum is obtained which exhibits maxima at 265 m$\mu$, 323 m$\mu$, and 430 m$\mu$ with log E values of 4.70, 4.63, and 3.79, respectively. Its infrared spectrum (KBr pellet) exhibits absorption maxima at 1563, 1471, 1429, 1269, 1202, 1177, 1087, 1047, 1020, 993, 948, 864, 844, 812, 772, 749 and 707 reciprocal centimeters.

12a-dexoxytetracycline is readily soluble in pyridine and dimethylformamide; soluble in tetrahydrofuran to the extent of about 700 mg./100 ml. in boiling methanol to about 100 mg./100 ml. and only slightly soluble in nitromethane. It is soluble in acetic acid up to about 2 g./100 ml. without rapid C–4 epimerization occurring.

It can be identified by its ultraviolet spectrum and by paper chromatography. The $R_f$ value using MacIlvaine's buffer, pH 3.5 (phosphate/citrate) as immobile phase and nitromethane:chloroform:pyridine:n-butanol (20:10:5:3) as mobile phase is 0.7–0.75.

12a-deoxytetracycline demonstrates bioactivity against *Klebsiella pneumoniae* and other organisms as mentioned below. It may be bioassayed by the standard turbidimetric procedure using *Klebsiella pneumoniae* as test organism.

As indicated above, the products of the present invention possess appreciable biological activity against a variety of pathogenic organisms. The following table lists the antibacterial activity of 12a-deoxytetracycline. The tests were conducted under standard conditions. Minimum inhibitory concentrations (MIC) in terms of mcg./ml. are reported.

TABLE I

| Organism | 12a-deoxytetracycline |
|---|---|
| *Micrococcus pyogenes* var. *aureus* | 3. |
| *Streptococcus pyogenes* | 3 |
| *Streptococcus faecalis* | 3 |
| *Diplococcus pneumoniae* | 6.3 |
| *Erysipelothrix rhusiopathiae* | 3 |
| *Corynebacterium diphtheriae* | 12.5 |
| *Listeria monocytogenes* | 12.5 |
| *Bacillus subtilis* | 3 |
| *Lactobacillus casei* | 100 |
| *Bacterium ammoniagenes* | 6.3 |
| *Aerobacter aerogenes* | 12.5 |
| *Escherichia coli* | 12.5 |
| *Proteus vulgaris* | 100 |
| *Pseudomonas Aeruginosa* | 100 |
| *Salmonella typhosa* | 12.5 |
| *Salmonella pullorum* | 6.3 |
| *Micrococcus pyogenes* var. *aureus* (antibiotic resistant strains): | |
| #376 | 100 |
| #400 | 50 |
| *Phytomonas phaseolicola* | 12.5 |
| *Xanthomonas vesicatoria* | 3 |
| *Klebsiella pneumoniae* | 25 |
| *Neisseria gonorrhoeae* | 6.3 |
| *Hemophilus influenzae* | 3 |
| *Shigella sonnei* | 12.5 |
| *Brucella bronchiseptica* | 6.3 |
| *Pasteurella multocida* | 3 |
| *Mycobacterium 607* | 1.56 |
| *Mycobacterium berolinense* | 0.39 |
| *Candida albicans* | 100 |
| *Streptococcus agalactiae* | 6.3 |

The 5a,6-anhydro-12a-deoxy compounds of this invention are readily prepared from a 12a-deoxytetracycline-type antibiotic having the formula:

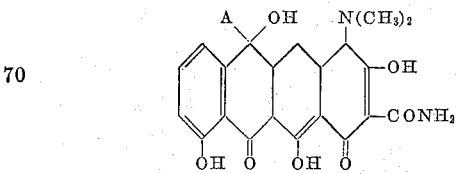

wherein A is as defined above by treatment with an acid dehydrating agent such as hydrochloric acid, hydrobromic acid, sulfuric acid, phosphoric acid, toluene sulfonic acid, benzene sulfonic acid in a reaction-inert organic solvent at a temperature of from about 0° C. to about 50° C. until one molecule of water is removed. Suitable solvents for this dehydration are lower alcohols, acetone, 1,2-dimethoxyethane, glacial acetic acid, and dimethylformamide. The 5a,6-anhydro products are isolated, generally as the acid addition salts by known methods, for example, by dilution of the reaction mixture with water, or by evaporation. The free base forms are obtained by neutralization.

The 5a,6-anhydro-12a-deoxy compounds are biologically active against a variety of gram-positive and gram-negative microorganisms generally to a somewhat lesser degree than are the parent tetracyclines. However, they are effective against certain tetracycline-resistant strains of bacteria and are, therefore, of considerable value.

The novel 12a-deoxy compounds of this invention may service as intermediates for the preparation of a variety of derivatives of tetracycline-type antibiotics. They can, for example, be converted to acid addition salts by treatment with a mineral acid, such as, hydrochloric acid, sulfuric acid, phosphoric acid, or a strong organic acid, such as, paratoluenesulfonic acid. As already mentioned, the 12a-deoxy compounds of this invention which contain a C–6 hydroxyl are easily converted to the corresponding 5a,6-anhydro derivatives on treatment with mineral acids. Therefore, because of this sensitivity to mineral acids, care must be exercised in preparing the acid addition salts of such 12a-deoxytetracyclines. The hydrochloride salt of 12a-deoxytetracycline, for example, is prepared by treating 12a-deoxytetracycline with hydrogen chloride in a 1:1 molar ratio. The use of an excess of hydrogen chloride results in dehydration at the 5a,6-positions with formation of 5a,6-anhydro-12a-deoxytetracyclines as discussed above.

Various substituents may be introduced at the 12a-position of the 12a-deoxy compounds. Bromination yields a product believed to contain a bromine atom in the 12a-position. Reaction with perbenzoic acid may introduce an hydroxyl group at the 12a-carbon atoms. In certain cases, the newly introduced groups possess the reverse stereochemistry of the 12a-hydroxyl group at the parent compound.

12a-deoxytetracyclines undergo reaction with a variety of reagents, often in a unique and unexpected manner. Treatment of 12a-deoxytetracycline with bromine in water produces 5a,6 - anhydro - 12a - deoxytetracycline whereas treatment with bromine in buffered solution produces a product having an ultraviolet spectrum identical to that of 4a,12a-anhydrotetracycline. Formaldehyde or trichloromethylfluoride yields a product which exhibits an 8-hydroxytetralone type absorption in the ultraviolet. The present new 12a-deoxytetracyclines serve as intermediates for the production of 4a,12a-anhydro-4-desdimethylaminotetracyclines. The prior art, 4-desdimethylamino-12a-deoxytetracycline e.g. 4-desdimethylamino-12a-deoxy-7-chlortetracyclines on the other hand are not suitable for this purpose. For example, 12a-deoxytetracyline reacts with peracids, e.g. perbenzoic acid or peracetic acid in inert solvents, such as, chloroform, tetrahydrofuran, dimethylformamide and the like with production of a product having an ultraviolet spectrum identical to that of 4a,12a-anhydrotetracycline, due to the removal of the 4-dimethylamino group to produce 4a,12a-anhydro-4-desdimethylaminotetracyclines. This same product is obtained by treatment of 12a-deoxytetracycline with an amino-nitrogen alkylating agent in the presence of an acid scavenger either neutral or basic. Basic acid scavengers include alkali metal (Na,K,Li) carbonates, bicarbonates and their obvious equivalents. Neutral acid scavengers include organic oxides such as propylene oxide, ethylene oxide, styreneoxide, 3-chloroprop-1-ene oxide and the like. By "amino-nitrogen alkylating agent" is meant any of the usual reagents commonly employed in the alkylation of amines, which include, for example, methyl iodide, dimethylsulfate, ethyl bromide, diethylsulfate, methylchloride, butylbromide, ethyliodide, benzylchloride, benzylbromide, propyl chloride and the like.

The production of the desdimethylaminotetracyclines by either of the two abovementioned methods is carried out in a reaction-inert solvent. By "reaction-inert solvent," as employed herein, is meant a solvent which does not react with the starting compounds or the products under the described conditions. Exemplary solvents are dialkyl ethers of mono, di, tri and tetraglycols, e.g. dimethyl ether of ethylene glycol and diethylene glycol, tetrahydrofuran, dioxane, dimethyl ether, acetic acid, dimethylformamide and the like.

Temperature does not appear to be critical in the present process, satisfactory results being obtained over a wide range. The use of high temperature, e.g. reflux temperature merely serves to shorten the reaction time, ensuring more complete and rapid conversion to the products. Reaction of the starting compounds appears to commence on contacting the reagents. The time required for the production of substantial amounts of the product will vary with the reaction temperature selected, the starting tetracycline compound and the method selected. Optimum yields of product are determined by paper chromatography using commonly employed solvent systems. For best yields the reaction is generally carried out over a period of from about 8 to about 24 hours.

The novel 4a,12a-anhydro-4-desdimethylaminotetracyclines of the present invention prepared from corresponding 12a-deoxytetracyclines are represented by the following formula:

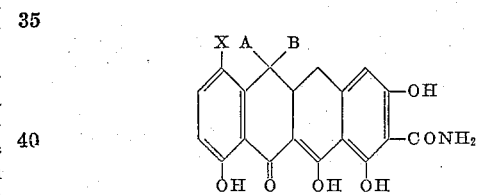

wherein X is selected from the group consisting of hydrogen and chlorine; A is selected from the group consisting of hydrogen and methyl; and B is selected from the group consisting of hydrogen and hydroxy.

Those compounds in which X is hydrogen are prepared from the 12a-deoxytetracyclines of this invention; those in which X is chlorine are prepared from 7-chloro-12a-deoxytetracyclines described in Union of South Africa Patent 3,651/58 wherein is described their preparation by reduction of the corresponding tetracyclines with zinc and aqueous ammonia.

The novel 4a,12a-anhydro-4-desdimethylaminotetracyclines of the present invention whose preparation from the 12a-deoxytetracycline antibiotic is described above are useful by virtue of the biological activity and as intermediates in tetracycline synthesis. The present new products are of particular importance as intermediates because they can be synthesized by conventional methods from commonly available starting materials. Hydrogenation of the aromatic A-ring of these substances provides 4-desdimethylamino-12a-deoxytetracyclines. The preparation of compounds of this type from tetracycline, chlortetracycline and oxytetracycline has been described in the chemical literature. The previous method involves treatment of the antibiotic containing both the 4-dimethylamino group and the 12a-hydroxyl with zinc and acetic acid. The re-introduction of the 12a-hydroxyl group is achieved by either biochemical or chemical oxidation procedures as described in the J.A.C.S. 81, p. 4748 and 4750 (1959). The hydroxylation procedure produces 4-desdimethylaminotetracyclines which are useful compounds by virtue of their antibacterial activity. Compounds of this type are described and claimed in U.S. Patent 2,786,077.

Alkaline solvent systems are preferred for the selective hydrogenation of the A-ring of the 4-desdimethylamino-4a,12a-anhydrotetracyclines. Temperatures in the range 20–160° C. may be employed. Hydrogenation catalysts comprised of finely divided palladium, rhodium, platinum, ruthenium, rhenium, and nickel are preferred as is the use of a lower alkanol as the solvent. Catalytic compounds of these metals such as rhenium heptaselenide are frequently applicable.

The selection of a solvent is rather severely restricted by the insoluble nature of the 4-desdimethylamino-4a,12a-anhydrotetracyclines. Water can serve as the solvent since the 4a,12a-anhydro compounds are somewhat soluble at alkaline pH's. The lower alkanols are in general preferred, however. They have adequate solvent capacity and they do not interfere with the hydrogenation reaction. Other solvents, however, can be used such as dichloroethane and ethers of ethylene glycol and diethylene glycol, such as dimethyl ethylene glycol and diethyl diethylene glycol.

The hydrogenation pressure required varies from atmospheric to 2000 p.s.i.g. depending upon the catalyst employed. A distinct decrease in the rate of hydrogen uptake at the completion of the reaction is not observed, so it is necessary to interrupt the process when one molecular proportion of hydrogen has been absorbed. Of course, when additional functional groups susceptible of hydrogenation are present such as halogen or nitro, the process is interrupted after one mole of hydrogen in addition to the requirement of these additional groups has been absorbed. In such situations, two, three, or more moles of hydrogen are needed.

Catalytic hydrogenation of 4-desdimethylamino-4a,12a-anhydro-6-deoxy-6-demethyltetracycline is illustrated by the following equation which is representative of the type of process discussed above.

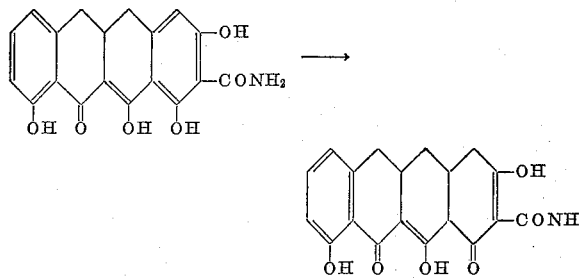

Thus it can be seen that the product resulting is simply a dihydro derivative of the 4a,12a-anhydro compound reduced.

Chemical methods of reduction are also applicable to this transformation. Particularly worthy of mention is the so-called Birch reduction (J. Chem. Soc. 434 (1944) which involves treatment of the substrate with sodium or lithium dissolved in liquid ammonia to which about one molecular proportion (based on substrate) of an alkanol such as isoamyl alcohol is added. A modified Birch reaction (J.A.C.S. 74, 5701 (1952); and 76, 631 (1954)) may also be used. The modification enables higher reaction temperatures by employing liquid amines, e.g. ethylamine, in place of liquid ammonia. Methyl hydride reductions employing for instance, a comparatively high proportion of a metal hydride such as sodium borohydride at elevated temperature (e.g. 50° C. and higher are used).

Furthermore, the 12a-deoxy and 4a,12a-anhydro compounds of this invention can be reacted with formaldehyde and various primary and secondary amines, including aliphatic, aromatic and heterocyclic amines, to form Mannich type reaction products, or with various aldehydes and ketones to form biologically active adducts in which carbonyl compound and antibiotic exist in a 1:1 molar ratio. The new compounds thus produced exhibit solubility characteristics which differ from those of the parent compounds. In addition 12a-deoxytetracyclines may serve as a basis for the synthesis of tetracycline and for the introduction of a halogen atom into the 12a-position.

This application is a continuation-in-part of copending application, Serial Number 813,654, filed May 18, 1959, now Patent Number 3,002,021.

The following examples are given by way of illustration and are not to be regarded as limitations of this invention, many variations of which are possible without departing from the spirit or the scope thereof.

*Example I*

12a-DEOXYTETRACYCLINE 15 g. of 12a-(O-formyl)-tetracycline, 200 ml. of tetrahydrofuran and 6 g. of 5% palladium on charcoal were placed into the reaction vessel of a Paar Hydrogenator. The reaction vessel was flushed with hydrogen, pressurized to 50 p.s.i. and then heated and agitated at 55° C. for 20 hours. The reaction vessel was cooled, the pressure released and the contents removed. The catalyst was filtered off and washed with 50 ml. tetrahydrofuran. An equal volume of methanol was added to the combined filtrate and washings and the resulting solution concentrated to one-third volume under reduced pressure at 30°–35° C.

The product which separated was removed by filtration, washed with methanol and dried. It was obtained as orange-red crystals containing one mole of methanol: M.P. about 230° C. (dec.).

*Analysis.*—Calcd. for $C_{22}H_{24}O_7N_2 \cdot CH_3OH$: 59.99% C; 6.13% H; 6.08% N; 6.73% methoxyl. Found: 60.19% C; 6.00% H; 5.87% N; 6.45% methoxyl.

Its infrared spectrum (KBr pellet) exhibits absorption maxima at 1563, 1471, 1429, 1269, 1202, 1177, 1087, 1047, 1020, 993, 948, 864, 844, 812, 772, 749 and 707 reciprocal centimeters.

In the ultraviolet region, a freshly prepared solution exhibits the following λ max.: (log ε) values: 264 mu (4.64), 325 mu (4.51), 430 mu (4.43), 450 mu (4.37) which change relatively rapidly until, after about 20 minutes, the following constant values are obtained: 265 mu (4.70), 323 mu (4.63), 430 mu (3.79).

Repetition of this procedure using dioxane, dimethylformamide, ethylether, cellosolve aceate, ethylacetate and pyridine as solvent produces the same product.

*Example II*

Following the procedure of Example I, but using 0.5 g. palladium black as catalyst, 15 g. of the anyhdrous amorphous form of 12a-(O-formyl) tetracycline was catalytically hydrogenolyzed in 250 ml. tetrahydrofuran to give a 44% yield of 12a-deoxytetracycline.

Using Whatman Paper No. 1 buffered to pH 3.5 with MacIlvaine's buffer, and chloroform:pyridine:nitromethane:n-butanol (10:3:20:5) as solvent system, $R_f$ values of 0.7–0.75 were obtained for 12a-deoxytetracycline. When assayed by the *Klebsiella pneumoniae* procedure, 12a-deoxytetracycline exhibited activity corresponding to about 33 mcg. Substitution of 12a-(O-phenylcarbamyl)-tetracycline for 12a-(O-formyl)-tetracycline gave the same product. Similarly, the same product is obtained when these reactants are hydrogenolyzed at atmospheric pressure and 100° C. using platinum black or platinum oxide as catalyst.

*Example III*

Using the procedure of Example I, and the reaction conditions listed below, 12a-deoxytetracycline was obtained in yields ranging from 34–50%.

| T,°C. | Pressure | Time (Hrs.) | Percent Yield |
|---|---|---|---|
| 55 | 40 | 23 | 44 |
| 55 | 50 | 10 | 34 |
| 85 | 40 | 12 | 37 |
| 55 | 120 | 10 | 40 |
| 100 | 40 | 8 | 34 |
| 55 | 100 | 23 | 50 |

*Example IV*

6-DEMETHYL-6,12a-DIDEOXYTETRACYCLINE

*Method I.*—A mixture of 3.0 g. of 12a-(O-formyl)-6-deoxy-6-demethyltetracylcine and 1.25 g. of 5% palladium-on-carbon in 75 ml. of tetrahydrofuran was placed in a reaction vessel of the Parr hydrogenator. The reaction vessel was flushed with hydrogen, pressurized to 40 p.s.i. and agitated at 52° C. for 12 hours. After cooling the reaction mixture was filtered and the filtrate washed with tetrahydrofuran. The catalyst cake was reslurried in methanol, filtered, washed with methanol and the combined methanol solutions evaporated to yield 0.85 g. of crude 12a-deoxy product. The crude product, 200 mg., is dissolved in 7 ml. of acetone containing 0.5 ml. of 5% hydrochloric acid. The crude base dissolves and the pure hydrochloride crystallizes. The collection of the crystalline material and drying yields 100 mg. of product.

*Method II.*—A mixture of 1 g. of 12a-(O-formyl)-6-deoxy-6-demethyltetracycline, and 0.5 g. of 5% palladium-on-carbon in 5 ml. of dimethylformamide was hydrogenated at 1 atmosphere of hydrogen gas for 7 hours. The reaction mixture was filtered and the filtrate washed with dimethylformamide. The combined mother liquor and washes were treated dropwise with an equal volume of water to obtain a pure 12a-deoxy product which is recovered by filtration, 60 mg. of product are obtained in this manner. Elemental analysis of the product gave the following results:

Calc'd for: $C_{21}H_{22}N_2O_6$: C, 63.3; H, 5.57; N, 7.03. Found: C, 62.7; H, 5.55; N, 6.85.

Ultraviolet absorption in methanolic HCl, the solution having been allowed to stand overnight to achieve tautomeric equilibrium shows λ max. at 265, 323, 428 and 449 mμ. The crystalline product melts at 274° C. (dec.).

*Example IV*

Following the procedure of the preceding examples, the $O^{12a}$-acyl derivatives of the tetracycline-type antibiotics listed below are converted to the corresponding 12a-deoxy derivatives.

| Reactant | Product |
|---|---|
| 12a-(O-monoformyl)-6-demethyltetracycline. | 6-demethyl-12a-deoxytetracycline. |
| 12a-(O-monoformyl)-6-demethyl-7-chlortetracycline. | 6-demethyl-12a-deoxytetracycline. |
| 12a-(O-monoformyl)-6-deoxytetracycline. | 6,12a-dideoxytetracycline. |
| 12a-(O-monoformyl)-6-deoxy-6-demethyltetracycline. | 6-demethyl-6,12a-dideoxytetracycline. |
| 12a-(O-phenylcarbamyl)-5-hydroxytetracycline. | 5-hydroxy-12a-deoxytetracycline. |
| 12a-(O-phenylcarbamyl)-6-deoxytetracycline. | 6,12a-dideoxytetracycline. |
| 12a-(O-phenylcarbamyl)-4-desdimethylamino-5-hydroxy-6-deoxytetracycline. | 4-desdimethylamino-5-hydroxy-6,12a-dideoxytetracycline. |
| 12a-(O-phenylcarbamyl)-7-bromotetracycline. | 12a-deoxytetracycline. |
| 12a-(O-phenylcarbamyl)-4-desdimethylamino-7-chlorotetracycline. | 4-desdimethylamino-12a-deoxytetracycline. |
| 12a-(O-phenylcarbamyl)-4-desdimethyl-amino-6-demethyltetracycline. | 4-desdimethylamino-6-demethyl-12a-deoxytetracycline. |
| 12a-(O-phenylcarbamyl)-4-desdimethylamino-6-deoxytetracycline. | 4-desdimethylamino-6,12a-dideoxytetracycline. |

*Example V*

12a-DEOXYTETRACYCLINE (FROM 12a-(O-FORMYL)-7-CHLORTETRACYCLINE)

Following the procedure of Example I, 2 g. of 12a-(O-formyl)-7-chlorotetracycline was converted to 12a-deoxytetracycline. The product was identified by paper chromatography using chloroform:pyridine:nitromethane:n-butanol (10:3:20:5) as solvent system; Whatman Paper No. 1 buffered at pH 3.5 with MacIlvaine's Buffer: $R_f=0.7$.

Substitution of the 12a-(O-monoformyl)derivative of 7-bromotetracycline for 12a-(O-monoformyl)-7-chlortetracycline produces 12a-deoxytetracycline.

*Example VI*

Following the procdures of the preceding Examples, the following $O^{12a}$-substituted phenylcarbamyl derivatives of tetracycline, 7-chlortetracycline and 7-bromotetracycline are hydrogenolyzed to 12a-deoxytetracycline.

(A) 12a-(O-substituted phenylcarbamyl)-tetracyclines
   o-chlorophenylcarbamyl
   o-methoxyphenylcarbamyl
   p-bromophenylcarbamyl
   p-ethoxyphenylcarbamyl
   2-chloro-4-tolylcarbamyl
   p-nitrophenylcarbamyl
   2,4-dichlorophenylcarbamyl
   2-nitro-4-tolylcarbamyl
   1-naphthylcarbamyl
   2,5-dichloro-1-naphthylcarbamyl (B) 12a-(O-substituted phenylcarbamyl)-7-chlortetracyclines
   m-chlorophenylcarbamyl
   p-nitrophenylcarbamyl
   o-tolylcarbamyl
   p-propoxyphenylcarbamyl
   p-hexylphenylcarbamyl
   4-(o-xylyl)carbamyl
   1-naphthylcarbamyl
   2-naphthylcarbamyl
   2,5-dichlorophenylcarbamyl (C) 12a-(O-substituted phenylcarbamyl)-7-bromotetracyclines
   p-propylphenylcarbamyl
   2,5-dimethoxyphenylcarbamyl
   o-nitrophenylcarbamyl
   p-fluorophenylcarbamyl

*Example VII*

Additional 12a-deoxy derivatives of the tetracycline-type antibiotics are parepared from the following reactants by the procedures of Example III.

| Reactant | Product |
|---|---|
| 12a-(O-2, 5-dichlorophenylcarbamyl)-5-hydroxy tetracycline. | 5-hydroxy-12a-deoxytetracycline. |
| 12a-(O-p-nitrophenylcarbamyl)-6-demethyltetracycline. | 6-demethyl-12a-deoxytetracycline. |
| 12a-(O-p-nitrophenylcarbamyl)-5-hydroxytetracycline. | 5-hydroxy-12a-deoxytetracycline. |
| 12a-(O-p-nitrophenylcarbamyl)-4-desdimethylaminotetracycline. | 4-desdimethylamino-12a-deoxytetracycline. |
| 12a-(O-p-nitrophenylcarbamyl)-4-des-dimethyl-amino-7-chlortetracycline. | 4-desdimethylamino-12a-deoxytetracycline. |
| 12a-(O-p-fluorophenylcarbamyl)-6-deoxytetracycline. | 6,12a-dideoxytetracycline. |
| 12a-(O-2, 4-dibromophenylcarbamyl)-6-deoxy-6-demethyltetracycline. | 6-demethyl-6,12a-dideoxytetracycline. |
| 12a-(O-o-tolylcarbamyl)-5-hydroxytetracycline. | 5-hydroxy-12a-deoxytetracycline. |
| 12a-(O-phenylcarbamyl)-4-desdimethyl-amino-6-demethyl-7-chlortetracycline. | 4-desdimethylamino-6-demethyl-12a-deoxytetracycline. |
| 12a-(O-p-propoxyphenylcarbamyl)-6-deoxytetracycline. | 6,12a-dideoxytetracycline. |
| 12a-(O-p-aminophenylcarbamyl)-6-demethyltetracycline. | 6-demethyl-12a-deoxy-tetracycline. |

| Reactant | Product |
| --- | --- |
| 12a-(O- p- iodophenylcarbamyl)-6-deoxy-5-hydroxytetracycline | 5- hydroxy- 6, 12a- dideoxytetracycline. |
| 12a-(O- p- butylphenylcarbamyl)-6-deoxytetracycline | 6, 12a-dideoxytetracycline. |
| 12a-(O- (o- xylyl)carbamyl)- 6- demethyl-7-chlortetracycline | 6- demethyl- 12a- deoxytetracycline |
| 12a-(O- p- aminophenylcarbamyl-4-desdimethylamino-tetracycline | 4- desdimethylamino- 12a- deoxytetracycline. |
| 12a-(O- p- aminophenylcarbamyl)-5-hydroxy-tetracycline | 5- hydroxy- 12a- deoxytetracycline. |
| 12a-(O- p- aminophenylcarbamyl)-4- desdimethylamino- 5- hydroxytetracycline | 4- desdimethylamino- 5- hydroxy-12a-deoxytetracycline. |
| 12a-(O- 1- naphthylcarbamyl)- 5-hydroxy-tetracycline | 5- hydroxy- 12a- deoxytetracycline. |
| 12a-(O- 3, 4- dimethyl- 1- naphthylcarbamyl)-6-demethyltetracycline | 6- demethyl- 12a- deoxytetracycline |
| 12a-(O- 8- nitro- 1- naphthylcarbamyl)- 4- desdimethylaminotetracycline | 4- desdimethylamino- 12a deoxytetracycline. |
| 12a-(O- 2- naphthylacrbamyl)-5-hydroxytetracycline | 5-hydroxy-12a-deoxytetracycline. |
| 12a-(O- phenylcarbamyl)- 4- desdimethylamino- 6- demethyl- 6- deoxytetracycline | 4- desdimethylamino- 6- demethyl-6, 12a-dideoxytetracycline. |

*Example VIII*

To 10.6 gms. of 12,12a-(O-diacetyl)-4-epitetracycline in 250 ml. of tetrahydrofuran contained in a Parr Hydrogenator was added 10.6 gms. of 5% palladium on charcoal. The reaction vessel was charged with hydrogen to 50 p.s.i. and heated to 55° C. for about 10 hours. The reaction mixture was cooled, filtered and evaporated to dryness under pressure. The residue, 12a-(O-monoacetyl)-4-epi-12a-deoxytetracycline was then hydrolyzed by dissolving in a 1:10 water-ammonia solution. The ammonium salt of 4-epi-12a-deoxytetracycline was obtained on evaporating the solution at room temperature in vacuo.

Neutralization of the ammonium salt with a dilute mineral acid produces the 4-epi-12a-deoxytetracycline.

In like manner, the following 10,12a-(O-diacyl)-derivatives of 5-hydroxytetracycline are converted to the 12a-deoxy derivative of 5-hydroxy-tetracycline: the diacetyl-, the dipropionyl-, the dicaproyl and the divaleryl derivatives.

*Example IX*

Following the procedure of Example I but using elevated pressures of 1000, 1500 and 2000 p.s.i., and a temperature of 50° C., 12a-(O-monoformyl) tetracycline was converted to 12a-deoxytetracycline.

Utilizing the same procedure plus, in the case of the diacyl reactants, the hydrolysis procedure of Example VIII, the following 12a-(O-acyl) compounds are converted to their respective 12a-deoxy derivatives:

12a-(O-monoacetyl)-5-hydroxytetracycline
12,12a-(O-diacetyl)-tetracycline
10,12a-(O-dipropionyl)-5-hydroxytetracycline
5,12a-(O-diacetyl)-5-hydroxytetracycline
12a-(O-monoacetyl)-tetracycline
12a-(O-monobutyryl)-tetracycline
12a-(O-monocaproyl)-tetracycline
12a-(O-monopropionyl)-7-bromotetracycline
12a-(O-monoacetyl)-7-chlortetracycline
12a-(O-monovaleryl)-tetracycline
12a-(O-monopropionyl)-5-hydroxytetracycline
diformyl-5-hydroxytetracycline

*Example X*

5a,6-ANHYDRO-12a-DEOXYTETRACYCLINE HYDROCHLORIDE

A solution of 1.0 g. 12a-deoxytetracycline in 2 molar methanolic hydrochloric acid was heated to boiling for 15 minutes. The yellow crystalline precipitate which separated was recrystallized from dioxanemethanol to yield 5a,6-anhydro-12a-deoxytetracycline hydrochloride. When assayed by the standard *Klebsiella pneumoniae* procedure it exhibited activity corresponding to about 23 mcg./mg.

In a similar manner, the following 5a,6-anhydro-12a-deoxy compounds are prepared (substituting 6 molar hydrochloric acid-n-propanol as the dehydrating reagent in the case of the 6-demethyl compounds):

5a,6-anhydro-6-demethyl-12a-deoxytetracycline
4-desdimethylamino-5a,6-anhydro-12a-deoxytetracycline
4-desdimethylamino-5a,6-anhydro-6-demethyl-12a-deoxytetracycline

*Example XI*

12a-DEOXYTETRACYCLINE HYDROCHLORIDE 1.0 g. of 12a-deoxytetracycline was dissolved in methanol containing an equimolar amount of hydrogen chloride. The salt was precipitated with ether and recrystallized from ethylacetate-methanol as yellow crystals.

In like manner, the hydrochloride salts of the 12a-deoxy products of Examples IV, VI, VIII and X are prepared, in the cases in which an amino group is present.

Substitution of sulfuric acid or phosphoric acid for hydrochloric acid produces the corresponding sulfate and phosphate salts.

*Example XIa*

METAL CHELATE SALTS OF 12a-DEOXYTETRACYCLINE

The metal salt complexes of the 12a-deoxytetracyclines are prepared by dissolving them in a lower aliphatic alcohol, preferably methanol, and treating with an equivalent amount of the appropriate metal salt preferably dissolved in methanol. The complexes are isolated in some instances by simple filtration, but often, since many of the metal salt complexes are alcohol soluble, by evaporation of the solvent or addition of a non-solvent such as diethyl ether.

In this fashion, metal salt complexes of the 12a-deoxytetracyclines described in the above examples are prepared employing the following metal salts: calcium chloride, cobalt chloride, magnesium sulfate, magnesium chloride, ferric chloride, zinc chloride, cupric chloride, cadmium chloride, barium chloride, silver nitrate, stannous nitrate, magnesium acetate, manganous chloride and cerium chloride. A number of these salts such as the calcium and magnesium complexes are useful for therapeutic purposes. Those salts not suitable for therapeutic purposes are useful in the purification and isolation of the 12a-deoxy compounds and also in the preparation of the therapeutically useful complexes.

*Example XII*

4a,12a-ANHYDRO-4-DESDIMETHYLAMINO-TETRACYCLINE 12a-deoxytetracycline, 2 grams, is dissolved in 175 ml. of dry tetrahydrofurane (distilled from calcium hydride). Methyliodide, 10 ml., and 10 ml. of propylene oxide are added to the solution and the reaction mixture heated at the reflux temperature for 24 hours. After approximately 3 hours at the reflux temperature, a precipitate composed of 4a,12a-anhydro-4-desdimethylaminotetracycline and tetramethylammonium iodide commences to form. At the end of the reflux, the precipitate is collected and then stirred with 10 ml. of warm (60° C.) water for 20 minutes to remove the tetramethylammonium iodide. The insoluble material consisting principally of 4a,12a-anhydro-4-desdimethylaminotetracycline is collected, washed and dried. The product exhibits absorption in the ultraviolet region of the spectrum at 254, 404, and 424 m$\mu$. Employing the solvent system 20:10:3 nitromethane:chloroform:pyridine as the mobile phase and filter paper saturated with pH 3.5 MacIlvaine's buffer (phosphate/citrate) as the immobile phase, this product exhibits an $R_f$ value of 0.78, a value in conformity with the less polar nature of the product as compared to 12a-deoxytetracycline ($R_f$ 0.7–0.75).

*Example XIII*

The procedure of Example XII is repeated substituting ethylene glycol dimethyl ether, dimethylformamide, or acetic acid as solvent in place of the tetrahydrofuran with similar results.

*Example XIV*

The procedure of Example XII is repeated employing one molecular proportion of methyl-iodide and one molecular proportion of propylene oxide in place of the large excess of these reagents specified in Example XII. When using these minimum quantities of these reagents, it is advisable to employ a sealed tube or autoclave as the reaction vessel in order to minimize loss of these exceedingly volatile reactants.

*Example XV*

Other alkylating agents in proportion corresponding to those of Example XII and XIV above may be substituted for the methyliodide of these examples. Suitable agents include dimethyl sulfate, ethyl bromide, diethylsulfate, methylchloride, butylbromide, ethyliodide, benzylchloride, benzylbromide, and propylchloride. In the case of the higher boiling of these agents, such as dimethylsulfate, diethylsulfate, and benzylbromide, it is not necessary to resort to the excess employed in Example XII or the pressure vessel employed in Example XIV. Similarly, other neutral acid scavengers such as ethyleneoxide, styreneoxide, 3-chloroprop-1-ene oxide, etc. may be substituted for the propylene oxide specified in those examples.

*Example XVI*

The procedure of Example XII is applied in analogous fashion to 7 - chloro - 6 - demethyl - 12a - deoxytetracycline, 7-chloro-6,12a-dideoxytetracycline, 6-demethyl-12a-deoxytetracycline, 6,12a-dideoxytetracycline, 6-demethly - 6,12a - dideoxytetracycline, 6,12a-dideoxytetracycline, to produce the corresponding 4a,12a-anhydro-4-desdimethylaminotetracyline.

*Example XVII*

12a-deoxytetracycline, 2 g., is dissolved in 175 ml. of boiling tetrahydrofuran and 10 g. of finely pulverized potassium carbonate and 10 ml. of methyliodide are added. The mixture is refluxed for 24 hours, cooled and the precipitate collected. It is next dissolved in water (pH 9 due to the presence of excess potassium carbonate) and the solution adjusted to pH 5.5. 4a,12a-anhydro - 4 - desdimethylaminotetracycline precipitates, weighing 0.81 g. When the filtrate is acidified to pH 2.5 a further quantity of material precipitates which is established by ultraviolet absorption not to be 12a-deoxytetracycline or 4a,12a - anhydro - 4 - desdimethylaminotetracycline.

*Example XVIII*

12a-deoxytetracycline, 500 mg., is dissolved in 200 ml. or ethyleneglycol dimethyl ether. A solution of 780 mg. perbenzoic acid in 12.5 ml. of chloroform is added and the mixture is kept at room temperature overnight. The solution is then tested with a standard sodium iodide thiosulfate solution for excess perbenzoic acid. This test indicates that essentially all of the perbenzoic acid has reacted. The solvent is evaporated in vacuo and the by-product benzoic acid (from the decomposition of the perbenzoic acid) is separated from the mixture by repeated washing with ether. The residue is then recrystallized from 1,2-dichloroethane to obtain 4a,12a-anhydro-4-desdimethylaminotetracycline.

*Example XIX*

12a-deoxytetracycline, 1 g., is dissolved in 50 ml. of acetic acid and treated with 1 ml. of 40% peracetic acid in acetic acid, (the commercially available material). The solution is stored overnight at room temperature, and the solvent evaporated leaving as residue 4a,12a-anhydro-4-desdimethylaminotetracycline.

What is claimed is:

1 Compounds of the formula:

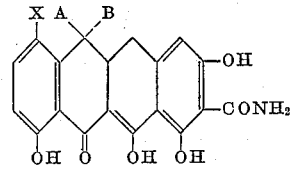

wherein:
X is selected from the group consisting of hydrogen and chlorine;
A is selected from the group consisting of hydrogen and methyl; and
B is selected from the group consisting of hydrogen and hydroxy.

2. 4a,12a-anhydro-4-desdimethylaminotetracycline.

3. 4a,12a - anhydro-4-desdimethylamino-6-deoxy-6-demethyltetracycline.

4. 4a,12a - anhydro-4-desdimethylamino-6-deoxy-6-demethyl-7-chlorotetracycline.

5. 4a,12a - anhydro-desdimethylamino-6-demethyltetracycline.

6. 4a,12a - anhydro - 4-desdimethylamino-6-deoxytetracyline.

7. The process which comprises treating a compound selected from the group consisting of

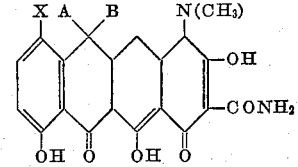

wherein:
X is selected from the group consisting of hydrogen and chlorine;
A is selected from the group consisting of hydrogen and methyl; and B is selected from the group consisting of hydrogen and hydroxy; in a reaction inert solvent with a reagent selected from the group consisting of perbenzoic acid and peracetic acid and subsequently isolating the resulting 4a,12a-anhydro-4-desdimethylamino derivative therefrom.

8. The process which comprises treating a compound selected from the group consisting of

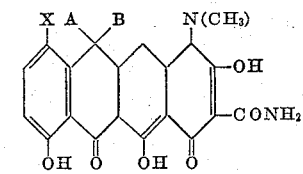

wherein:
X is selected from the group consisting of hydrogen and chlorine;
A is selected from the group consisting of hydrogen and methyl; and B is selected from the group consisting of hydrogen and hydroxy; in a reaction inert solvent with a reagent selected from the group consisting of di(lower alkyl)sulfate, lower alkyl halide, and benzyl halide in the presence of an acid scavenger selected from the group consisting of alkali metal carbonate, alkali metal bicarbonate, lower alkylene oxide and styrene oxide and subsequently isolating the resulting 4a,12a-anhydro-4-desdimethylamino derivative therefrom.

(References on following page)

References Cited in the file of this patent

UNITED STATES PATENTS 2,922,817    Green _____ Jan. 26, 1960

FOREIGN PATENTS 744,019    Great Britain _____ Jan. 25, 1956
748,724    Great Britain _____ May 9, 1956
785,047    Great Britain _____ Oct. 23, 1957

OTHER REFERENCES

Stephens et al.: Journal American Chemical Society, vol. 76, pages 3568–3575, (1954).

Stephens et al.: Journal American Chemical Society, vol. 80, pages 5324–25, (Oct. 5, 1958).